United States Patent
Shah

(10) Patent No.: US 8,514,054 B2
(45) Date of Patent: Aug. 20, 2013

(54) PERSONNEL KEY TRACKING SYSTEM

(75) Inventor: Raj M Shah, Burbank, CA (US)

(73) Assignee: Aramark Uniform & Career Apparell Group, Inc., Burbank, CA (US)

( * ) Notice: Subject to any disclaimer, the term of this patent is extended or adjusted under 35 U.S.C. 154(b) by 58 days.

(21) Appl. No.: 13/148,365

(22) PCT Filed: Jan. 22, 2010

(86) PCT No.: PCT/US2010/021802
§ 371 (c)(1),
(2), (4) Date: Aug. 8, 2011

(87) PCT Pub. No.: WO2010/090485
PCT Pub. Date: Jul. 28, 2011

(65) Prior Publication Data
US 2012/0119876 A1 May 17, 2012

(51) Int. Cl.
*G05B 19/00* (2006.01)
*H04Q 9/00* (2006.01)
*G06K 9/00* (2006.01)

(52) U.S. Cl.
USPC ........... 340/5.53; 340/5.51; 340/5.1; 382/115

(58) Field of Classification Search
USPC .................. 340/5.1, 5.2, 5.51, 5.53; 382/115
See application file for complete search history.

(56) References Cited

U.S. PATENT DOCUMENTS

| | | | |
|---|---|---|---|
| 4,337,987 A | 7/1982 | Brooks et al. | |
| 5,079,935 A | 1/1992 | Zaucha | |
| 5,812,252 A | 9/1998 | Bowker et al. | |
| 5,880,954 A | 3/1999 | Thomson et al. | |
| 5,964,112 A | 10/1999 | Stefanescu | |
| 6,532,508 B2 | 3/2003 | Heckel et al. | |
| 6,788,980 B1 | 9/2004 | Johnson | |
| 6,837,084 B2 | 1/2005 | Bailey et al. | |
| 6,928,855 B2 | 8/2005 | Barnett et al. | |
| 7,076,311 B2 | 7/2006 | Schuster | |
| 7,116,069 B1 | 10/2006 | Holterman et al. | |
| 7,161,261 B2 | 1/2007 | Stubbs et al. | |
| 7,181,941 B2 | 2/2007 | Eden, Jr. | |
| 7,768,549 B2 * | 8/2010 | Cofer | 348/152 |
| 2004/0215354 A1 | 10/2004 | Nakamura et al. | |

(Continued)

FOREIGN PATENT DOCUMENTS

| | | |
|---|---|---|
| JP | 2001-160534 | 6/2001 |
| JP | 2007-198560 | 8/2007 |
| JP | 2008-191823 | 8/2008 |

*Primary Examiner* — Jennifer Mehmood
*Assistant Examiner* — Omar Casillashernandez
(74) *Attorney, Agent, or Firm* — Cozen O'Connor

(57) ABSTRACT

A safety system comprising a work area having a perimeter and hazardous automated machinery within the perimeter, wherein access by workers to the work area within the perimeter is controlled by one or more controlled access points; at least one safety work cell within the perimeter, each safety work cell having no hazardous automated machinery within or accessible from the safety work cell; a primary key-secondary key system which includes a tertiary key receptacle within the safety work cell; an optional light barrier surrounding each safety work cell; optional fingerprint scanners to authenticate authorized persons, and a controller programmed to permit operation of the hazardous automated machinery only when all controlled access points are closed, all secondary keys are placed within either a secondary key receptacle or a tertiary key receptacle, any light barrier has not been tripped by interruption of the light barrier, and any fingerprint scanners have authenticated a person.

9 Claims, 2 Drawing Sheets

(56) References Cited

U.S. PATENT DOCUMENTS

| | | |
|---|---|---|
| 2006/0212144 A1 | 9/2006 | Bechtel et al. |
| 2007/0101873 A1 | 5/2007 | Etherton et al. |
| 2007/0205861 A1* | 9/2007 | Nair et al. ............ 340/5.61 |
| 2009/0072631 A1 | 3/2009 | Iida et al. |
| 2009/0315229 A1* | 12/2009 | Tomasic ................ 266/44 |

* cited by examiner

PERSONNEL KEY TRACKING SYSTEM

BACKGROUND OF THE INVENTION

This invention relates to the field safety related control systems (SCRS) which are designed to protect the safety of personnel who enter, work in, and leave areas called "cells" where there is automated machinery. In the U.S., these SCRS's are regulated by OSHA.

A few different systems have been devised to allow individuals to enter an automatically functioning cell. Each one of these systems requires stopping automation completely when a worker enters and is within the protected area. For example with the " Lock Out-Tag Out" system, the automated functioning of the equipment is completely stopped before any person can enter the automated work area, or "cell." Once the individual enters the automated work area, this method does not have any means to track location of the person in the cell and therefore can not allow automation to resume at any time the system is working in automated mode without risk of the individual getting exposed to the hazard. Another system is known as "Confined Space Entry," a protocol which requires doing all of the steps in "Lock-Out Tag-Out" but with more rigorous documentation requirements and limiting access only to personnel trained to do a particular job. As far as the tracking of an individual is concerned, the "Confined Space Entry" system has the same level of limitations as the "Lock Out-Tag Out" system. Both these methods rely heavily on administrative measures to eliminate hazards prior to entry into the automated cell by a person.

Another major class of such SCRS systems are known as "Trapped Key" systems. Trapped key systems use fixed barrier guards to form a "gated area" around automated work cells and an interlocked key system at the entry gates. At each entry gate there are two sets of keys, a primary key and one or more secondary key(s). An individual who desires to enter a trapped key controlled cell containing automation is required to remove the primary key from its home receptacle which causes the automation machinery to shut down to permit the individual to enter the gated area as the lock from which the primary key was withdrawn is interlocked with the automation control system. The individual has to insert the primary key into a secondary receptacle and "trap" it in by turning it, which causes one or more secondary keys to be released and the access gate to open. Each individual entering into the work cell is required to carry one secondary key. While one or more secondary keys are missing from the secondary key receptacle(s), the primary key can not be removed and the gate can not be locked, thus preventing resumption of automation in error. In other words, all the secondary keys must be returned to their receptacles to release the trapped primary key so that the primary key can be returned, the gate closed, and the automation restarted.

An example of a trapped key system was disclosed by Bailey, U.S. Pat. No. 6,837,084, assigned to Fortress Interlocks Limited, which described an interlock unit for use with at least one other like unit to form an interlock mechanism which has a top face and opposed pairs of side walls with at least one runner bar mounted in the unit for lateral sliding movement.

Prior trapped key SCRS systems always disable automation any time a person needs to enter into the automated work cell and do not track the location of the individual in the cell. They only function to turn off automation until the primary key is replaced.

SCRS systems which do not utilized trapped keys are also known. For example, Thomson U.S. Pat. No. 5,880,954 disclosed a SRCS designed to safeguard personnel operating hazardous production equipment. The SRCS monitors the machine, the operator, and itself for safe operation and utilizes a non-material barrier such as a light curtain-presence sensing system to sense the intrusion of a person's body into a hazardous area of a machine. The SRCS uses machine feedback and/or operator interface to determine whether a hazardous condition is present. If such condition is present, the hazard is rendered harmless by the time the intruding body member can reach the potential danger area. The system includes separable means for stopping motion of the moving parts of the equipment, starting movement of the movable parts, and detecting faults in sections of the system.

In environments were there is a need to frequently enter the automated cell, there is a significant adverse affect on output or efficiency of the process within the cell due to the disabling or suspending of automation each time a trapped key is removed from its receptacle.

Heckel, U.S. Pat. No. 6,532,508, disclosed a control system for controlling safety-critical processes having a first control unit for controlling a safety-critical process and at least one signal unit linked to the safety-critical process via I/O channels. Among the processes are monitoring of guards, protective doors, light barriers, two-hand switches, and reaction to emergency shut down devices. It describes a field bus connecting said first control unit and said signal unit, and a bus master for controlling communication on said field bus. Said first control unit and said signal unit each comprise safety-directed arrangements for ensuring failsafe communication among each other. Said bus master is connected to said field bus separately from said first control unit and said signal unit.

Barnett, U.S. Pat. No. 6,928,855, disclosed zero speed indicators, i.e., motion detectors, that are used to control the opening of barriers guarding moving machine components. The indicators may be tested by removing them from the components during operation without shutting down production or in certain situations the indicators may be tested during the run down phase of the components caused by machine stop initiations. The tests allow to anticipate and hence prevent hazardous opening of barriers due to a faulty zero speed indication.

Schuster, U.S. Pat. No. 7,076,311, Rockwell Automation Technologies, disclosed a configurable control system for operating an industrial system in a reliable, safety-enhanced manner, which includes storing onto a controller a master program capable of being used to operate a generalized industrial system having a maximum number of safety subsystems of a given type, among which are trapped key subsystems.

Holterman, U.S. Pat. No. 7,116,069, disclosed a safety system intended to ensure the safety of humans working in the area of potentially dangerous machinery in an industrial process which accepts inputs from emergency stop buttons, rope pull switches, safety mats, key switches, light curtains and the like, and stop the operation of equipment based on a command or the presence of a human in a dangerous area. The invention is directed to electric motors, and safety systems may disable those motors to stop the equipment, rather than trapped key systems per se.

Stubbs, U.S. Pat. No. 7,161,261, also assigned to Fortress Interlocks Limited, disclosed a control method and apparatus for a door-locking mechanism which includes an electrically-released latch, to lock the door closed.

Eden, U.S. Pat. No. 7,181,941, disclosed a pin tumbler-type cylinder lock having an auxiliary tumbler stack, the bottom pin of the auxiliary tumbler stack has a recessed underside for receiving a projection on the key to form a detent. When the projection on the key is seated, it prevents the key from being withdrawn from the keyway while the plug is in any rotational position in which the drive and bottom pins are not substantially aligned. Thus, the key is retained whenever the plug has been rotated.

Nakamura, U.S. Pat. Publ. 2004/0215354 disclosed a safety network system constructed by connecting a safety programmable controller ("PLC") to a safety slave through a safety network which obtains safety input information from a plurality of safety devices connected thereto and transmits information based on the plurality of safety input information in response to a request from the safety PLC. Among the sensors, light curtains which detect incoming persons or parts of a body and shut down system operation are disclosed. Nothing about trapped key systems is disclosed.

Bechtel, U.S. Pat. Publ. 20060212144, disclosed a light barrier contact-less safety device, i.e., a safety device operating without contact has an interface for the transmission of output signals to connectable appliances for signal processing. The output signals from the individual sensors of the safety device operating without contact can be transmitted separately via the interface.

Etherton, U.S. Pat. Publ. 2007/0101873, disclosed a jam detection and safety device for jamming machinery which mentions at paragraphs 0041, 0042, and 0049 trapped key switches such as Fortress brand (68 and 72 in FIG. 3), with a description of use of such switches to protect against inadvertent starting of, for example, balers, when the operator is clearing a jam. See paragraphs 0041-0042. This published application does not disclose the idea of sub-cells controlled by tertiary keys.

Prior art systems require stopping automation completely and do not have any means for tracking the location of the worker in the cell and therefore can not allow automation to resume while a worker is within the cell. Currently there is no safe way to track an individual entering into an automatically functioning work cell to observe the operation or conduct certain type of work from inside the cell while the cell is working under full automation without bypassing the safety mechanism installed on the cell or exposing individuals to the hazards.

SUMMARY OF THE INVENTION

It is an object of the present invention to provide a safety work cell within a work area which has hazardous automated machinery or equipment so that a worker can work within the safety work cell while the automated machinery is operating within the work area but outside the safety work cell.

The problem being addressed by the invention relates to allowing an individual to enter into an automatically functioning work cell to observe the operation or work from inside the cell while the cell is working under full automation without bypassing the safety mechanism installed on the cell or exposing individual to the hazards.

These objects, and others which will become apparent from the following disclosure and drawings, are addressed by the present invention which comprises in one aspect a safety system comprising a work area having a perimeter and hazardous automated machinery within the perimeter, access by workers to the work area within the perimeter controlled by one or more controlled access points; at least one safety work cell within the perimeter, each safety work cell having no hazardous automated machinery within or accessible from the safety work cell; a primary key receptacle at each controlled access point and a primary key which fits within each primary key receptacle, configured so that upon turning and removing the primary key, automation is stopped and a secondary key is released when such primary key is inserted in to the secondary key exchange box at the controlled access point; at least one secondary key; at least one secondary key exchange box at each controlled access point configured to release a secondary key upon locking a primary key into the secondary key exchange box and to unlock the associated control access point to allow a worker to enter; at least one tertiary key receptacle within each safety work cell configured to receive at least one secondary key; an optional light barrier surrounding each safety work cell; an optional finger print scanner located within each safety work cell; a controller programmed to permit operation of the hazardous automated machinery only when all controlled access points are closed, all secondary keys are placed within either a secondary key receptacle or a tertiary key receptacle, any optional light barrier has not been tripped by interruption of the light barrier, and any optional finger print scanner has identified an authorized finger print.

The perimeter can be formed, for example, by one or more fixed barrier guards, one or more natural barriers, or a combination of fixed barrier guards and natural barriers.

The light barrier, if present, can be formed by light beams surrounding each safety work cell adapted to be tripped upon breaking a light beam, and can include failsafe means to signal the controller if a light beam has been tripped, in which case the controller causes the automated machinery to shut down.

The controlled access point can be a gate, for example, and would normally include a failsafe connection, either wired or wireless, to the controller to signal whether the gate is open or closed.

In some embodiments one or more of the safety work cells is moveable within the work area, for example by means of one or more motors which are controlled by one or more controls which are configured to be controlled by the control system managing the automated work cell or by a worker within the safety work cell and is integrated in to the automation controls for the automated work cell to ensure safe positioning of safety work cell at all the times.

The controlled access point, when it is a gate, can include a sliding bolt which can be moved so that the gate can be opened only upon removal of the secondary key from the secondary key receptacle.

The system in some embodiments can include one or more fingerprint scanners located inside the safety work cell configured to identify and authorize a worker to resume the automation from inside the safety work cell. Finger print scanners can be used in some embodiments to authenticate removal of a primary key from the home position, thus reducing chance of unauthorized person interrupting the automation in the work cell.

A secondary key, when released from its secondary key receptacle, is to be carried by a worker entering the work area. The worker must close the controlled access point through which he entered behind him and carry the secondary key with him inside the work area.

The controlled access point is monitored through a failsafe electrical circuit to ensure that it remains closed. According to this invention the individual can resume automation while inside the work area by entering a designated area, referred to herein as a safety work cell, which is in effect a "sub-cell" inside the main automated work cell, and then placing the secondary key (which had been released from a secondary key receptacle) into a tertiary receptacle (using failsafe electrical connection to the controller, either wired or wirelessly) within the designated area/sub-cell.

When the controller reads that the number of keys missing from the secondary receptacles match to the number of keys in the tertiary controller, collectively in any combination, it will allow automation to resume, provided the controlled access point, monitored through failsafe electrical circuit, is closed. If the worker exits the designated area inside the cell or another person opens the door, automation is disabled by the controller. Automation is also disabled if there is a light barrier around a safety work cell which is broken or tripped or, in the case of a work cell with multiple controlled access point, a second primary key is turned and or removed from its home receptacle.

The controller allows automation to continue when an individual inserts a secondary key in a tertiary receptacle within the safety work cell.

In some embodiments a fingerprint scanner authorization system can be used to control resumption of automation while inside the sub-cell. In some embodiments a light curtain can be used to ensure that a worker does not move out of a designated area/sub-cell. In some embodiments a combination of light curtain(s) and fingerprint scanner(s) can be used to ensure that worker does not move out of the designated area after resuming automation.

Advantages of the invention are that it is self monitoring, and allows tracking of a person while inside the cell. One or more person can be inside the automated work cell for as long as necessary without fear of loosing production as s/he can resume automation if desired and when in safe position to do so. This system does not rely on the administrative means to ensure safety of a person.

DETAILED DESCRIPTION OF THE INVENTION

Figure 1:
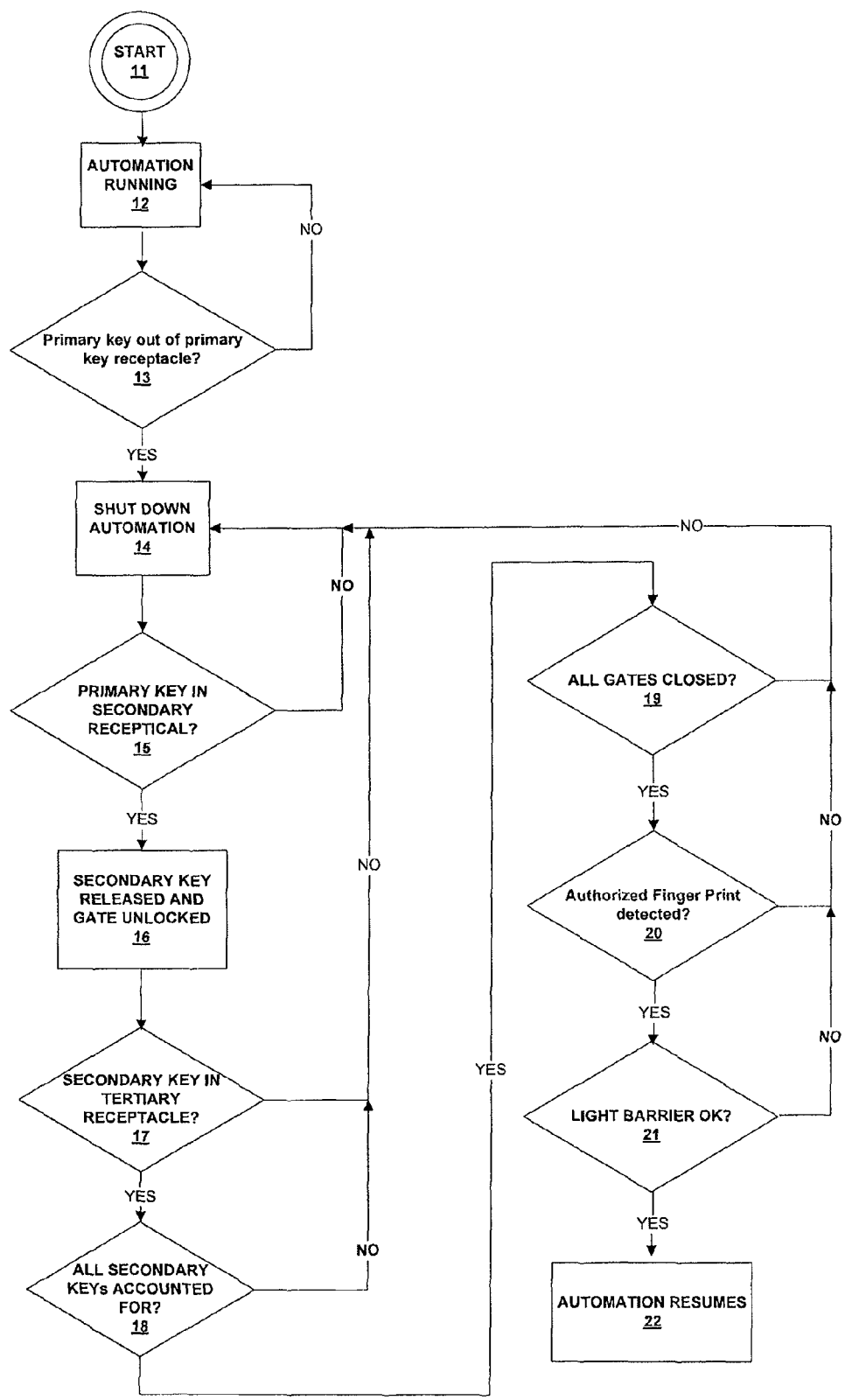
FIG. 1 is a flow chart illustrating an embodiment of the invention.
Figure 2:
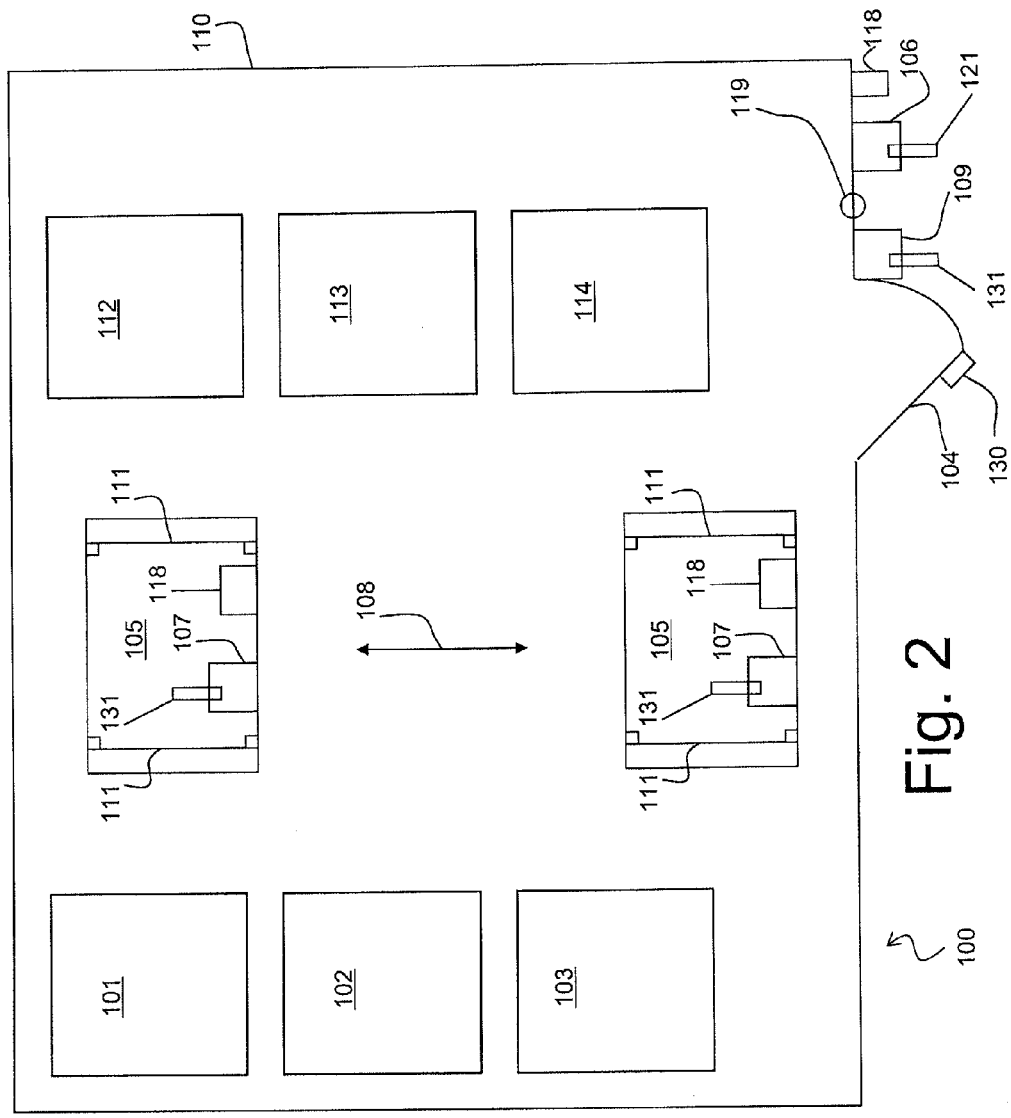
FIG. 2 is a schematic of one embodiment of the invention.

Referring first to FIG. 1, an embodiment of a process according to the invention is illustrated wherein the process starts 11 when automation is running 12. Referring to FIG. 2, a work area 100 is defined by a work area perimeter 110, in the illustrated embodiment being formed by a combination of barrier guards, fences, and fixed barriers such as a wall, the perimeter comprising a gate 104. Near the gate 104 but outside the perimeter 110 are a primary key receptacle 106 and a secondary key receptacle 109. Machines 101, 102, 103, 112, 113, and 114 are hazardous, for example automated industrial washing machines, and automated physical movement of the equipment must be shut down when any worker is in the work area to avoid accidents. A safety work cell 105 having a tertiary key receptacle 107 is provided within the work area and is configured so that a worker may enter within or stand atop or under the safety work cell 105. The safety work cell 105 can be moved within the work area, for example by a motor having a driving mechanism so the worker within the safety work cell can operate it and move it in a selected 108 direction for a selected distance to a desired safe location. The safety work cell 105 can also move automatically as long as keys are in proper receptacles and no other safety systems are breached.

Referring back to FIG. 1, the worker may remove 13 a primary key 121 from the primary key receptacle 106 which the controller causes automation to be shut down 14. The worker inserts the primary key into a secondary key receptacle 109 which is near the primary key receptacle 106 in the illustrated embodiment, which releases 16 a secondary key 131 and unlocks the gate, through a sliding bolt 130 which is mechanically released in the illustrated embodiment.

The worker then enters the work area 100 through the gate 104 or other controlled access point and enters the safety work cell 105, then places 17 his secondary key 131 in the tertiary key receptacle 107. In the illustrated embodiment there are two safety work cells 105, each of which having two light barriers 111 at the open ends of the safety work cells facing the machines 101, 102, 103 on one side and 112, 113, and 114 on the other side of the work area. The light barriers 111 are in communication with the controller so that if they are tripped or breached, the controller causes automation to immediately stop. There are several secondary keys 131, depending on the maximum number of workers who the system is designed to accommodate at the same time within the work area. There are also more than one gate 104, each gate 104 having a primary key 121, secondary keys 131, a primary key receptacle 106, and a secondary key receptacle 109.

The controller is appropriately connected electronically (in failsafe mode) by wires or wirelessly to each gate 104, tertiary key receptacle 107, light barriers 111, and fingerprint scanner 118 so that only when all secondary keys 131 which have been removed from secondary key receptacles 109 are either in 17, or replaced in, a secondary key receptacle 109, no light barrier 111 has been tripped 21, no secondary key 131 is unaccounted for 19, and all gates 104 are closed 20 before automation is directed by the controller to be resumed 22.

The invention is capable of considerable modification, alteration and equivalents in form and function, as will occur to those ordinarily skilled in the pertinent arts. The depicted and described preferred embodiments of the invention are exemplary only and are not exhaustive of the scope of the invention. The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. Consequently, the invention is intended to be limited only by the spirit and scope of the appended claims, giving full cognizance to equivalents in all respects.

What is claimed is:

1. A safety system comprising;
   a work area having a perimeter and hazardous automated machinery within the perimeter, access by workers to the work area within the perimeter controlled by one or more controlled access points;
   at least one safety work cell within the perimeter, each safety work cell having no hazardous automated machinery within or accessible from the safety work cell;
   a primary key receptacle at each controlled access point and a primary key which fits within each primary key receptacle, configured so that upon turning the primary key, automation is stopped;
   at least one secondary key;
   at least one secondary key exchange box at each controlled access point comprising at least one secondary key receptacle;
   the at least one secondary key exchange box configured to release the at least one secondary key upon locking the primary key into the at least one secondary key receptacle and to unlock the associated control access point to allow a worker to enter;

at least one tertiary key receptacle within each safety work cell configured to receive the at least one secondary key;

and a controller programmed to permit operation of the hazardous automated machinery only when all controlled access points are closed, all secondary keys are placed within either the secondary key receptacle or the tertiary key receptacle.

2. The safety system of claim 1 wherein the perimeter is formed by one or more fixed barrier guards, one or more natural barriers, or a combination of fixed barrier guards and natural barriers.

3. The safety system of claim 1 including a light barrier formed by light beams surrounding each safety work cell, adapted to be tripped upon breaking a light beam, and means to signal the controller if a light beam has been tripped, in which case the controller causes the automated machinery to shut down.

4. The safety system of claim 1 comprising a switch which is configured to signal the controller when the controlled access point is open or closed.

5. The safety system of claim 1 wherein one or more safety work cells is moveable within the work area by means of one or more motors which are controlled by one or more controls which are configured to be controlled by a worker within the safety work cell.

6. The safety system of claim 1 wherein the controlled access point comprises a gate.

7. The safety system of claim 1 wherein the controlled access point comprises a gate and a sliding bolt which can be moved so that the gate can be opened only upon removal of the primary key from the primary key receptacle.

8. The safety system of claim 1 further including one or more fingerprint scanners configured to identify and authorize a worker to enter the work area through a controlled access point.

9. The safety system of claim 1 including one or more fingerprint scanners configured to identify and authorize a worker to enter the work area through a controlled access point and one or more light barriers formed by light beams surrounding each safety work cell, adapted to be tripped upon breaking a light beam, and means to signal the controller if a light beam has been tripped, the controller adapted to continue or start automation only when no light beam has been dripped and each fingerprint scanner has identified a fingerprint of an authorized person.

\* \* \* \* \*